United States Patent
Graves et al.

(10) Patent No.: US 10,015,111 B2
(45) Date of Patent: Jul. 3, 2018

(54) SYSTEM AND METHOD FOR STEERING PACKET STREAMS

(71) Applicant: Huawei Technologies Co., Ltd., Shenzhen (CN)

(72) Inventors: Alan Frank Graves, Kanata (CA); Peter Ashwood-Smith, Gatineau (CA); Eric Bernier, Ottawa (CA); Dominic John Goodwill, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 500 days.

(21) Appl. No.: 13/902,008

(22) Filed: May 24, 2013

(65) Prior Publication Data

US 2014/0269351 A1   Sep. 18, 2014

Related U.S. Application Data

(60) Provisional application No. 61/787,847, filed on Mar. 15, 2013.

(51) Int. Cl.
*H04L 12/933* (2013.01)
*H04Q 11/00* (2006.01)

(52) U.S. Cl.
CPC ......... *H04L 49/10* (2013.01); *H04Q 11/0005* (2013.01); *H04Q 11/0062* (2013.01);
(Continued)

(58) Field of Classification Search
CPC ........... H04Q 11/0067; H04Q 11/0005; H04Q 11/0041; H04Q 11/0071; H04Q 11/0001;
(Continued)

(56) References Cited

U.S. PATENT DOCUMENTS 4,797,879 A * 1/1989 Habbab ............... H04J 14/0227
370/425
5,541,914 A 7/1996 Krishnamoorthy et al.
(Continued)

FOREIGN PATENT DOCUMENTS

CN   1618253 A   5/2005
EP   1652328 B1   1/2007
(Continued)

OTHER PUBLICATIONS

Benson, T., et al., "Network Traffic Characteristics of Data Centers in the Wild," IMC 2010 Proceedings of the 10th ACM SIGCOMM Conference on Internet Measurement, Nov. 1-3, 2010, Melbourne, Australia, pp. 267-280.
(Continued)

*Primary Examiner* — Hassan Kizou
*Assistant Examiner* — Roberta A Shand
(74) *Attorney, Agent, or Firm* — Slater Matsil, LLP

(57) ABSTRACT

In one embodiment, a system for steering an input packet stream includes a traffic splitter configured to split an input packet stream into a first packet stream and a second packet stream, and a photonic switching fabric coupled to the traffic splitter, where the photonic switching fabric is configured to switch the first packet stream. The system may also include an electrical packet switching fabric coupled to the traffic splitter, where the electrical packet switching fabric is configured to switch the second packet stream, and a traffic combiner coupled to the photonic switching fabric and to the electrical packet switching fabric, where the traffic combiner is configured to merge the first switched packet stream and the second switched packet stream to produce a first packet flow.

21 Claims, 6 Drawing Sheets

(52) U.S. Cl.
CPC .............. *H04Q 2011/0039* (2013.01); *H04Q 2011/0064* (2013.01)

(58) Field of Classification Search
CPC .......... H04Q 2011/0015; H04L 7/0075; H04L 49/101; H04L 43/00; H04L 47/00; H04L 49/00; H04L 49/10; H04J 14/0217
See application file for complete search history.

(56) References Cited

U.S. PATENT DOCUMENTS

| | | | |
|---|---|---|---|
| 6,542,968 B1* | 4/2003 | Spencer | G06F 12/0862 711/137 |
| 6,546,012 B2* | 4/2003 | Kamo | H04J 3/1647 370/395.1 |
| 6,559,989 B1 | 5/2003 | Kim et al. | |
| 6,741,562 B1* | 5/2004 | Keirouz et al. | 370/230 |
| 7,209,658 B2* | 4/2007 | Penninckx et al. | 398/47 |
| 7,336,902 B1* | 2/2008 | Gerszberg et al. | 398/115 |
| 7,720,379 B2* | 5/2010 | Handelman | H04Q 11/0005 370/232 |
| 7,968,248 B2 | 6/2011 | Liu et al. | |
| 8,554,860 B1* | 10/2013 | Cook | H04L 47/12 709/207 |
| 8,965,203 B1* | 2/2015 | Vahdat et al. | 398/48 |
| 2004/0158623 A1* | 8/2004 | Avida et al. | 709/221 |
| 2005/0041606 A1* | 2/2005 | Hori | H04L 49/353 370/299 |
| 2005/0105906 A1 | 5/2005 | Barbosa et al. | |
| 2006/0159454 A1* | 7/2006 | Bjornstad | 398/51 |
| 2011/0010748 A1* | 1/2011 | Asami | H04N 5/783 725/116 |
| 2012/0039601 A1 | 2/2012 | Bjornstad | |
| 2012/0063353 A1* | 3/2012 | Schlenk | H04L 12/12 370/253 |
| 2012/0170596 A1* | 7/2012 | Hwang | H04N 21/236 370/471 |
| 2014/0105493 A1* | 4/2014 | Wu | G06T 9/00 382/166 |

FOREIGN PATENT DOCUMENTS

| | | |
|---|---|---|
| EP | 2458761 A1 | 5/2012 |
| WO | 02093389 A1 | 11/2002 |

OTHER PUBLICATIONS

Benson, T., et al., "Understanding Data Center Traffic Characteristics," WREN •09, Aug. 21, 2009, Barcelona, Spain, 8 pages.
Chi, et al., "Experimental Characteristics of Optical Crosspoint Switch Matrix and Its Applications in Optical Packet Switching," Journal of Lightwave Technology, vol. 24, No. 10, Oct. 2006, pp. 3646-3653.
Wang, G., et al., "Your Data Center Is a Router: The Case for Reconfigurable Optical Circuit Switched Paths," In Proc. ACM Hotnets-VIII, (New York City, NY. USA), Oct. 2009, pp. 1-6.
Wang, G., et al., "c-Through: Part-time Optics in Data Centers," SIGCOMM '10, Aug. 30-Sep. 3, 2010, New Delhi, India, pp. 327-338.
International Search Report for Application No. PCT/CN2014/073332, dated Jun. 19, 2014.
Ma, et al., "Hybrid Photonic Ethernet Switch for Datacenters," Optical Society of America, Mar. 9, 2014, 3 pages.
Perello, et al., "All-Optical Packet/Circuit Switching-Based Data Center Network for Enhanced Scalability, Latency, and Throughput," IEEE Network, Nov./Dec. 2013, 10 pages.

\* cited by examiner

SYSTEM AND METHOD FOR STEERING PACKET STREAMS

This application claims the benefit of U.S. Provisional Application Ser. No. 61/787,847 filed on Mar. 15, 2013, and entitled "System and Method for Steering Packet Streams" which application is incorporated herein by reference.

TECHNICAL FIELD

The present invention relates to a system and method for communications, and, in particular, to a system and method for packet stream routing.

BACKGROUND

Data centers route massive quantities of data. Currently, data centers may have a throughput of 5-7 terabytes per second, which is expected to drastically increase in the future. Data Centers consist of huge numbers of racks of servers, racks of storage devices and other racks, all of which are interconnected via a massive centralized Packet Switching resource. In data centers, electrical packet switches are used to route all data packets, irrespective of packet properties, in these data centers.

The racks of servers, storage, and input-output functions contain top of rack (TOR) packet switches which combine packet streams from their associated servers and/or other peripherals into a lesser number of very high speed streams per TOR switch routed to the electrical packet switching core switch resource. Also, TOR switches receive the returning switched streams from that resource and distribute them to servers within their rack. There may be 4×40 Gb/s streams from each TOR switch to the core switching resource, and the same number of return streams. There may be one TOR switch per rack, with hundreds to ten thousands of racks, and hence hundreds to ten thousands of TOR switches in a data center. There has been a massive growth in data center capabilities, leading to massive electronic packet switching structures.

SUMMARY

An embodiment system for steering an input packet stream which includes a traffic splitter configured to split an input packet stream into a first packet stream and a second packet stream, and a photonic switching fabric coupled to the traffic splitter, where the photonic switching fabric is configured to switch the first packet stream. The system may also include an electrical packet switching fabric coupled to the traffic splitter, where the electrical packet switching fabric is configured to switch the second packet stream, and a traffic combiner coupled to the photonic switching fabric and to the electrical packet switching fabric, where the traffic combiner is configured to merge the first switched packet stream and the second switched packet stream to produce a first packet flow.

Another embodiment system for steering an input packet stream includes a traffic splitter configured to split an input packet stream into a first packet stream and a second packet stream, where packets of the first packet stream have a first packet length threshold of greater than or equal to a first packet size, and where packets of the second packet stream have a second packet length threshold of less than the first packet size. The system may also include a photonic switching fabric coupled to the traffic splitter, where the photonic switching fabric is configured to switch the first packet stream, and an electrical packet switching fabric coupled to the traffic splitter, where the electrical packet switching fabric is configured to switch the second packet stream.

An embodiment method of steering an input packet stream includes splitting the input packet stream into a first packet stream and a second packet stream, and switching the first packet stream with a photonic switching fabric. The method may also include switching the second packet stream with an electrical packet switching fabric, and combining the switched first packet stream and the switched second packet stream.

Another embodiment method of steering an input packet stream includes splitting the input packet stream into a first packet stream and a second packet stream, where packets of the first packet stream have a first packet length of less than a first packet size threshold, and where packets of the second packet stream have a second packet length of greater than or equal to the first packet size threshold. The method may also include directing the first packet stream to an electrical packet switching fabric. Additionally, the method may further include diverting the second packet stream around the electrical packet switching fabric and to a photonic switching fabric.

An embodiment system for switching packets of packet streams by steering an input packet stream which includes a traffic splitter configured to split an input packet stream into a first packet stream and a second packet stream, and a photonic switching fabric coupled to the traffic splitter, where the photonic switching fabric is configured to switch the first packet stream. The system may also include an electrical packet switching fabric of a lesser capacity than the overall capacity of the packets being switched by the embodiment system coupled to the traffic splitter, where the electrical packet switching fabric is configured to switch the second packet stream, and a traffic combiner coupled to the photonic switching fabric and to the electrical packet switching fabric, where the traffic combiner is configured to merge the first switched packet stream and the second switched packet stream to produce a first packet flow.

An embodiment system for enhancing a traffic carrying capacity of a packet switching node includes a plurality of packet stream splitters configured to split a first plurality of input packet stream into a second plurality of packet streams and a third plurality of packet stream in accordance with a comparison of lengths of packets of the first plurality of packet stream to a first threshold, where packets of the second plurality of packet streams have lengths greater than the first threshold and packets of the third plurality of packet stream have lengths less than or equal to the first threshold. The system also includes a photonic switch configured to switch the second plurality of packet streams to produce a fourth plurality of packet streams and an electronic packet switch having a first capacity less than a second capacity of the electronic packet switch and the photonic switch, where the electronic packet switch is configured to switch the third plurality of packet streams to produce a fifth plurality of packet streams. Additionally, the system includes a plurality of packet stream combiners configured to merge the fourth plurality of packet streams and the fifth plurality of packet streams to produce a sixth plurality of packet streams.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Reference to data throughput and system and/or device capacities, numbers of devices, and the like is purely illustrative, and is in no way meant to limit scalability or capability of the embodiments claimed herein.

Figure 1:
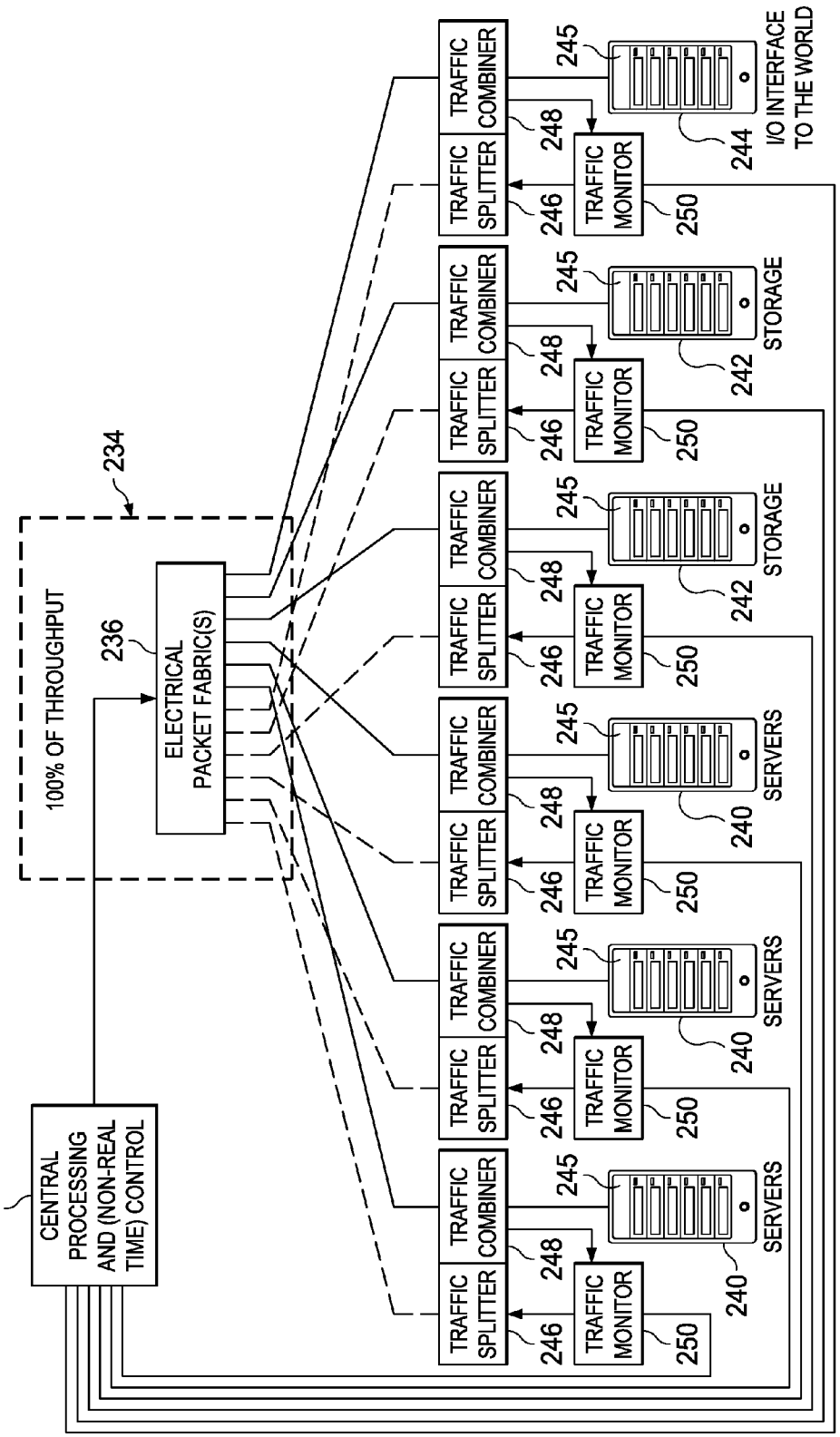
FIG. 1 illustrates an embodiment data center.

FIG. 1 illustrates a data center 230. Data center 230 contains central processing unit 232 which provides non-real time control and management to central packet switch 234. Central packet switch 234 may contain one or more parallel large electrical packet switches, such as electrical packet fabric 236. The throughput of central packet switch 234 may be about 5 terabytes per second. Coupled to central packet switch 234 are servers 240, storage units 242, and I/O interface 244. The racks of servers 240, storage units 242, and I/O interface 244 each contain TOR switches 245. Traffic splitters 246 split the traffic from the racks and the TOR switches over multiple parallel links, for example 4 by 40 gigabits per second to central packet switch 234. Traffic combiners 248 combine the traffic from multiple parallel links from central packet switch 234. Also, traffic monitors 250 monitor the traffic and provide information to central processing unit 232. In an example, traffic splitters 246 and traffic combiners 248 are separate from the rest of the TOR. Alternatively, the traffic splitters 246 and traffic combiners 248 are embedded into TOR switches 245 for convenience of implementation.

It is becoming desirable for large amounts of data, for example 10's or 100's of terabytes per second or, in the future, several petabytes per second of data bandwidth, to pass through large data centers. Electrical switches are throughput-capacity-constrained due to the limitations in the capacity of their electronic switching matrices and thermally constrained due to the difficulty in removing the enormous waste heat these fabrics generate in a small physical volume. Also, electrical switches consume a large amount of power and can have a large physical size.

The massive growth in data center capacity is driving electronic packet switches to the limits of their capacity. However, the replacement of all the functions of an electronic packet switch, including all the flow control, etc., by photonic functions operable over the full size range of all packets from about 50 bytes per packet up to either 1,500 or 9,000 bytes per packet is problematic.

Figure 2:
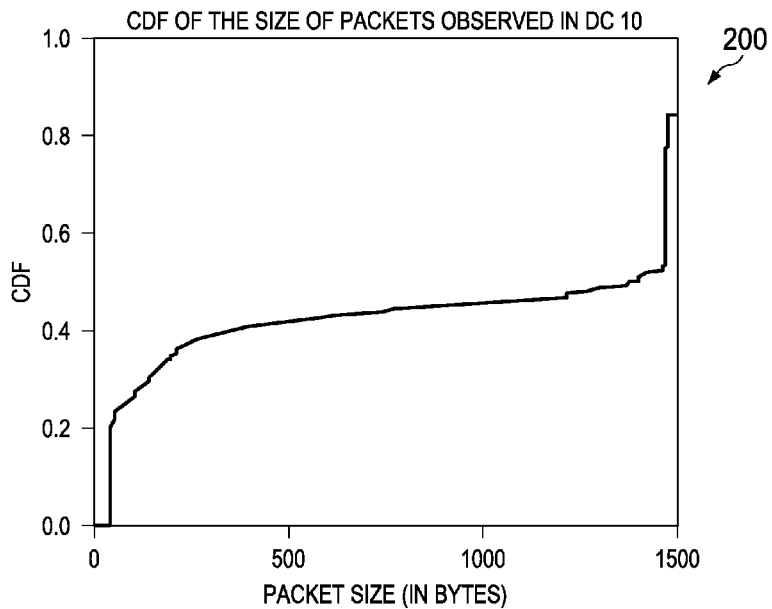
FIG. 2 illustrates a graph of packet size versus cumulative density function for packets smaller than that size for an example data center.

FIG. 2 illustrates graph 200 of a cumulative density function (CDF) of packets smaller than the packet size versus packet size, in bytes, for the size of observed packets, measured in a data center, such as data center 230. Other published information on packet size distributions is highly correlated to the data illustrated in graph 200. The maximum packet size illustrated in graph 200 is 1500 bytes. Some data centers use larger packets, such as 9,000 byte "jumbo packets" with a similar bimodal size distribution. There is a bimodal distribution within a concentration of small packets and a concentration of large packets. In graph 200, 45% of the packets have fewer than 500 bytes, 5% of the packets have between 500 bytes and 1400 bytes, and 50% of the packets have over 1400 bytes. Many of the short packets are extremely short, and consist of acknowledgement packets, messages, control, requests, and leftover data. For a packet size of 500 bytes, there is a CDF of 0.42 and for a packet size of 1000 bytes, there is a CDF of 0.48. Thus, only 6% of packets are between 500 bytes and 1000 bytes. In fact, 35% of packets are less than 200 bytes, 50% of packets are greater than 1400 bytes, and only 15% of packets are between 200 and 1400 bytes, which is 80% of the packet size range.

Figure 3:
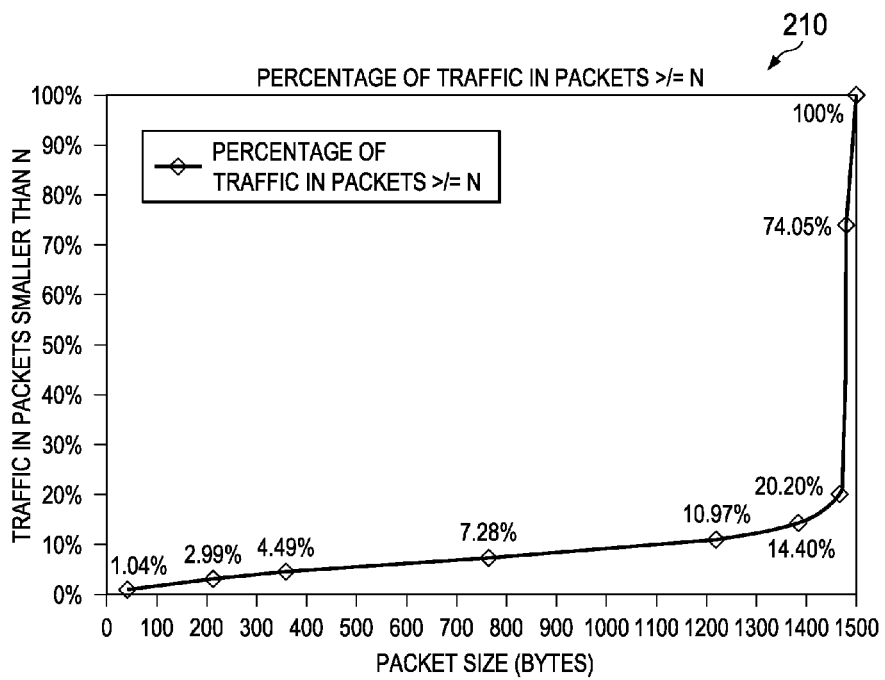
FIG. 3 illustrates a graph of packet size versus the percentage of traffic packet bandwidth in packets smaller than the packet size for an example data center.

FIG. 3 illustrates graph 210, which is derived from the graph 200 by plotting the percentage of the traffic bandwidth of the percentage of traffic packets smaller than a packet size versus packet size. Because the larger traffic packets contain more traffic per packet, most of the traffic consists of large packets, although there are a significant number of small packets. Graph 210 has the same packet distribution as graph 200. In graph 210, 1.04% of traffic is from packets that are 50 bytes or shorter, 2.99% of the traffic is from packets that are 220 bytes or shorter, 4.49% of the traffic is from packets that are 360 bytes or shorter, 7.28% of the traffic is from packets that are 760 bytes or shorter, 14.40% of the traffic is from packets that are 1380 bytes or shorter, 20.20% of the traffic is from packets that are 1460 bytes or shorter, 74.05% of the traffic is from packets that are 1480 bytes or shorter, and 100.00% of the traffic is from packets that are 1500 bytes or shorter.

The size threshold between short packets and long packets may typically be between 500 bytes and 1400 bytes, although higher and lower size thresholds may be used. For example, if jumbo packets are used with packet sizes up to 9,000 bytes, the size threshold may be in the range of 500-8400. This size threshold may be static, or it may be dynamic, controlled by a feedback loop based on real time traffic measurements, for instance from data gathered by statistics gathering module 144. For an example where the boundary is 800 bytes, the electronic packet switching fabric switches about 8% of the bandwidth, while the photonic switching fabric switches about 92% of the bandwidth. If the size threshold is set at 1380 bytes, 14.4% of the bandwidth is routed to the electronic packet switching fabric, with 85.6% of the packet bandwidth routed to the photonic switching fabric, and there is a gain of 6.94=(85.6+14.4)/14.4 in the throughput compared to a system with only electrical switching fabric. Also, if the size threshold is set at 360 bytes per packet, the electrical packet switching fabric handles 4.49% of the packet bandwidth and the photonic switch handles 95.51% of the bandwidth, with a gain in the bandwidth of 22.27=(95.51+4.49)/4.49. In an example, 80 to 95 percent of the packet bandwidth is switched through the photonic switching fabric, which, in concert with the residual short packet streams flowing through the electronic packet switch, increases the capacity of the overall packet switching node by a factor of about five to twenty times. If 85% of the bandwidth passes through the photonic switching fabric, there is an increase in overall switch node capacity of six times. If 95% of the bandwidth passes through the photonic switch, there is a gain of twenty times. In an example, the packet size of the short packets varies more than the packet size of the long packets, because most long packets are at or near the maximum packet size. To be able to realize this benefit, it is necessary to be able to split the packet streams into two streams based upon the packet length of the packets in each flow of each stream and then, after switching, to be able to reconstitute them into intact packet flows in the new packet streams.

In another example, jumbo packets are used. Jumbo packets are packets that are longer than the standard length of approximately 1500 bytes. For example, jumbo frames may be between 1500 bytes and 9000 bytes, although they may be even larger. In this case, the packet size threshold value may be set much higher, for example from about 7500 to about 8500, although possibly higher.

Electronic packet switches suffer serious bandwidth congestion. Diverting long packets which carry the most bandwidth into a photonic packet switch leaves the electronic packet switch to only handle the short packets which represent between 5 and 20% of the overall bandwidth in a normal data center, dependent on the packet size threshold for splitting the packets. This deloads the bandwidth throughput of the electronic packet switch by 80-95%, ameliorating its bandwidth problems. Also, the photonic packet switches are simplified, since all the packets they are switching are approximately the same length, or can be padded to become the same length without suffering much efficiency loss, allowing simpler single stage (or effectively single stage) switching between buffer points, which can be left in the electronic domain. Therefore, the photonic packet switch becomes an electrically buffered fast photonic circuit switch fabric or photonic burst switch fabric. Deloading the electronic packet switches provides a significant increase in spare capacity on that switch, because of the drastic reduction in the required bandwidth that the electronic packet switches are tasked to switch. That capacity can be allocated to switch further sources of packet streams of packets below the size threshold, while the packet streams containing packets above the size threshold are switched in the electronically buffered photonic packet switching layer.

Figure 4:
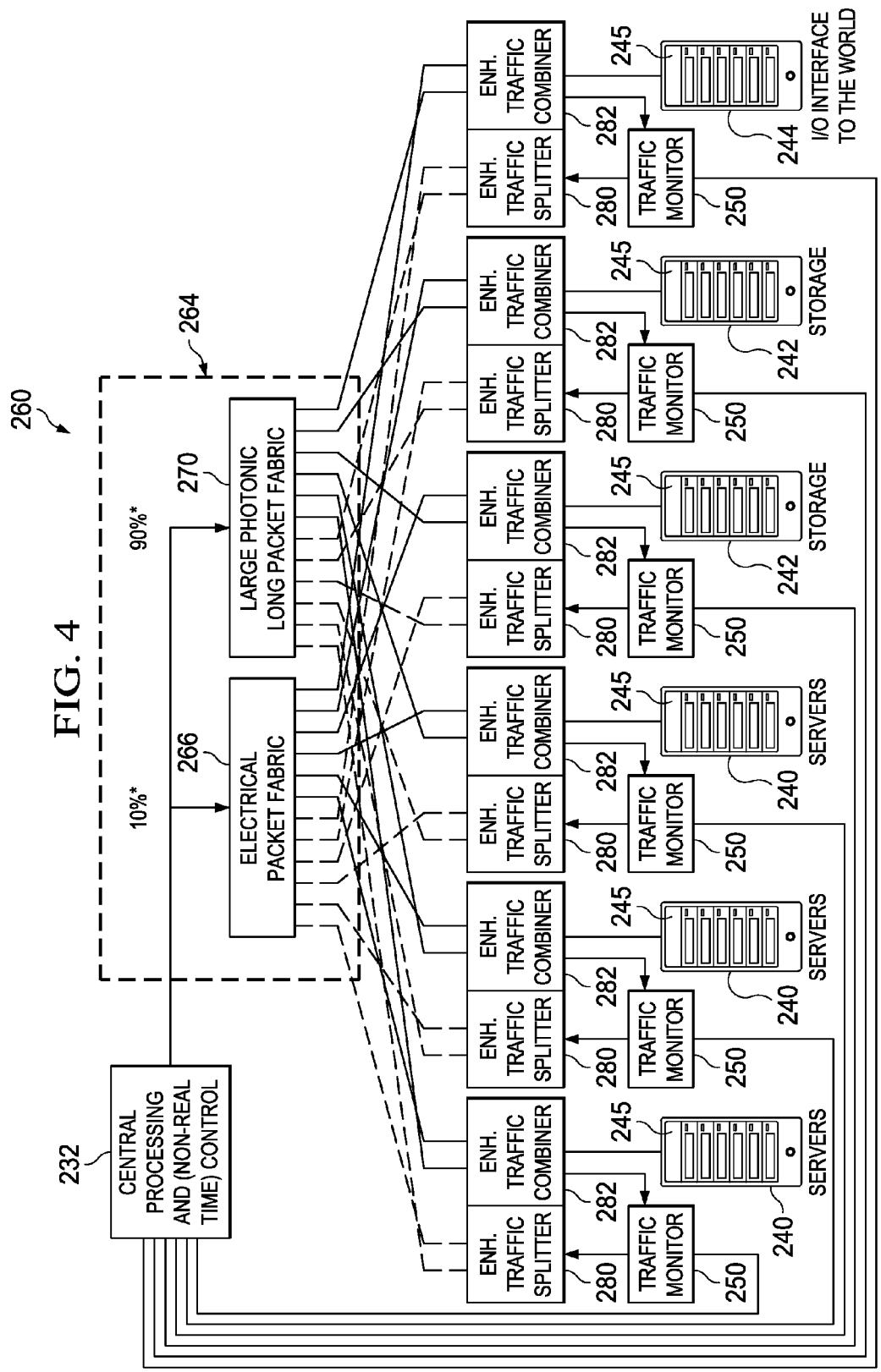
FIG. 4 illustrates another embodiment data center.

FIG. 4 illustrates data center 260. Like data center 230, data center 260 contains servers 240, storage units 242, I/O interface 244, traffic monitors 250, TOR switches 245 and central processing control 232. However, data center 260 contains central packet switch 264, which contains electrical packet switching fabric 266 and photonic switching fabric 270. Electrical packet switching fabric 266 contains centralized or distributed processing functions, and photonic switching fabric 270 contains centralized or distributed processing functions. These centralized or distributed processing functions provide real-time packet-by-packet routing of the packet streams through the switch fabrics. Central packet switch 264 may contain one or more parallel electrical packet switches and one or more parallel photonic packet switches. In one example, electrical packet fabric 266 switches 10% of the traffic bandwidth, or about 5 terabytes per second, but much more than 10% of the packets, since all of its packets are small, while photonic switching fabric 270 switches 90% of the traffic bandwidth, or 45 terabytes per second, but much less than 90% of the packets, since all of its packets are large. In this example the overall node capacity has been increased from 5 TB/s to 50 TB/s by the application of the photonic switch with the packet stream splitters and combiners.

TOR switches 245 are coupled to enhanced traffic splitters 280 and enhanced traffic combiners 282. Multiple links to and from TOR switches 245 are connected to central packet switch 264. In an example, packets are segregated by length, with long packets going to the photonic switch and short packets going to the electrical switch. Generally, if the bandwidth handling capacity of the electronic switch fabric is the limiting factor and if 90% of the traffic bandwidth is routed to the photonic switch, there is a ten times increase in the bandwidth capacity of the overall switch node. Enhanced traffic splitters 280 map the outgoing traffic over several links to central packet switch 264, and segregate the packets by length, so the short packets are streamed to electronic packet switching fabric 266 and the long packets are streamed to photonic switching fabric 270. The lower the size threshold between short packets and long packets, the greater the improvement in performance, because more traffic is routed to photonic switching fabric 270 instead of to electronic packet switching fabric 266. However, for a lower size threshold photonic switching fabric 270 must be able to set up connections faster, because the photonic switching fabric handles a wider range of packet sizes, including shorter packets and a slow set up time would reduce switching throughput.

Enhanced traffic combiners 282 interleave the short and long received packets to restore the packet sequence integrity. Because the long and short packets will have traveled over different paths, through different switches with different buffering strategies, and will have different delays, they may arrive out of time sequence. Enhanced traffic combiners 282 put the packet in the correct order, for example using a packet sequence number or a timestamp.

In an example, there are 2500 top of rack switches, with 10,000 connections. If, for example, each top of rack switch has a capacity of 400 Gb/s or 50 GByte/s, the core switch resource has a switching capacity of 1 Pb/s or 125 TBytes/sec. In an example, 950 Tb/s or 118.75 PBytes/s of packets larger than the threshold value flows through photonic switching fabric 270, while 50 Tb/s or 6.25 TBytes/s) of packets smaller than the threshold value flows through electrical packet switching fabric 266. The value of 950:50 corresponds to a packet split threshold of about 400 bytes.

Figure 5:
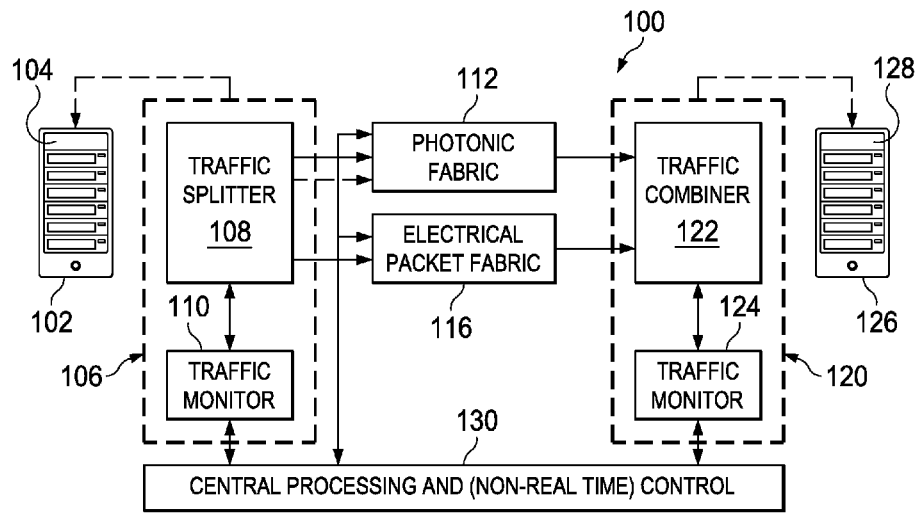
FIG. 5 illustrates an embodiment system for packet stream routing.

FIG. 5 illustrates system 100 for packet stream routing. Some packets are routed through electrical packet switches, while other packets are routed through photonic switches. For example, short packets may be switched by electrical packet switches, while long packets are switched by photonic switches. By switching long packets, the photonic packet switching speed is relatively relaxed, because the packet duration is long. In an example, long packets may have a variable length, and the photonic switch uses asynchronous switching. Alternatively, long packets may be transmitted as fixed length packets by padding them to a fixed length, for example 1500 bytes. This is only slightly less efficient than the asynchronous approach since most of the long packets are either at the fixed maximum length or are very close. Then, the photonic switch may use asynchronous switching, but may instead use synchronous switching using a fast set up photonic circuit switch or burst switch.

Splitter 106 may be housed in TOR switch 104, housed in racks 102. Alternatively, splitter 106 may be a separate unit. There may be thousands of racks and TOR switches. Splitter 106 contains traffic splitter 108, which splits the packet stream into two traffic streams, and traffic monitor 110, which monitors the traffic. Splitter 106 may add identities to the packets based on their sequencing within each packet flow of a packet stream to facilitate maintaining the ordering of packets in each packet flow which may be taking different paths when they are recombined. Alternatively, packets within each packet flow may be numbered or otherwise individually identified before reaching splitter 106, for example using a packet sequence number or transmission control protocol (TCP) timestamps. One packet stream is routed to photonic switching fabric 112, while another packet stream is routed to electrical packet switching fabric 116. In an example, long packets are routed to photonic switching fabric 112, while short packets are routed to electrical packet switching fabric 116. Photonic switching fabric 112 may have a set up time of about two to twenty nanoseconds. The set up time, being significantly quicker than the packet duration of a long packet (1500 bytes at 100 Gb/s is 120 ns) does not seriously affect the switching efficiency. However, switching short packets at this switching set up time would be problematic. For instance, 50 byte control packets at 100 Gb/s have a duration of about 4 ns, which is less than the median photonic switch set up time. Photonic switching fabric 112 may contain an array of solid state photonic switches, which may be assembled into a fabric architecture, such as Baxter-Banyan, Benes, or CLOS.

Also, photonic switching fabric 112 contains processing unit 114, and electrical packet switching fabric 116 contains centralized or distributed processing functions. The processing functions provide packet by packet routing through the fabric, based upon the signaling/routing information, either carried as a common channel signaling path or as a par-packet header or wrapper.

Figure 6:
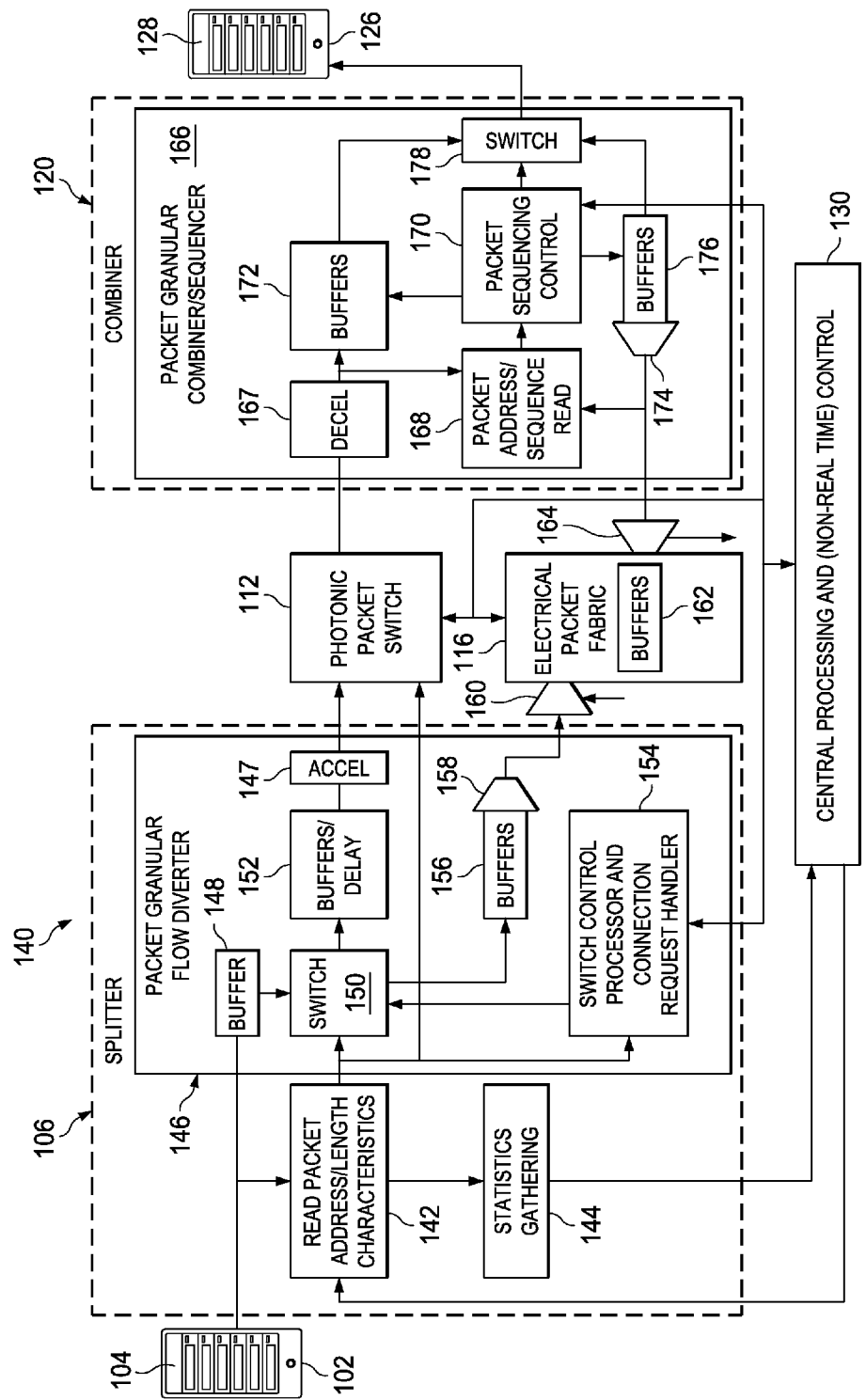
FIG. 6 illustrates an embodiment system for packet stream routing.

The output switched packets of photonic switching fabric 112 and electrical packet switching fabric 116 are routed to traffic combiner 122. Traffic combiner 122 combines the packet streams while maintaining the original sequence of packets, for example based on timestamps or sequence numbers of the packets in each packet flow. Traffic monitor 124 monitors the traffic. Central processing and control unit 130 monitors and utilizes the output of traffic monitor 110, and of traffic monitor 124. Also, central processing and control unit 130 monitors and provisions the control of photonic switching fabric 112 and electrical packet switching fabric 116, and provides non-real time control to photonic switching fabric 112. Additionally, central processing and control unit 130 is a fast real-time control system responsive to packet connection instructions from the packet stream or from the length characteristics module 142, depending upon the design of photonic switch and electrical packet switching fabric 116. Traffic combiner 122 and traffic monitor 124 are in combiner 120, which may reside in TOR switches 128 of which there is typically one per rack, in thousands of racks 126. Alternatively, combiner 120 may be a stand-alone unit. FIG. 6 illustrates system 140 for routing packet streams. System 140 is similar to system 100, but system 140 provides more detail for splitter 106 and combiner 120. Initially, the packet stream is fed to a buffer 148 in packet granular flow diverter 146, which diverts individual packets into one path or another based upon a measured or detected packet attribute such as packet length, while read packet address and length characteristics module 142 determines the packet address and the length of the packet. The packet address and length are fed to statistics gathering module 144, which gathers statistics to send to control unit 130. Control unit 130 gathers statistics on the mix of packet lengths for non-real time uses, such as dynamic optimization of the packet size threshold value, and switch control processor and connection request handler 154, which handles the real time packet-by-packet processes within packet granular flow diverter 146. The packet stream that is buffered in the buffer 148 then passes through the packet granular flow diverter 146, which contains buffer 148, switch 150, buffer and delay 152, switch control processor and connection request handler 154, buffer 156, and statistical multiplexer 158, under control of switch control processor and connection request handler 154. Packet granular flow diverter 146 may optionally contain accelerator 147, which accelerates the packet in time and increases the inter-packet gap of the packet stream.

Buffer 148 stores the packet while the packet address and length are read. Buffer 148 may include an array of buffers, so that packets with different destination addresses (i.e. different packet flows) can be buffered until the appropriate switching fabric output port has capacity available for them without delaying packets in other packet flows with other destination addresses where output port capacity is available. Also, the packet address and length characteristic are fed to read packet address and length characteristics module 142 and to switch control processor and connection request handler 154. The output of switch control processor and connection request handler 154 is fed to switch 150 to operate it based on whether the packet length exceeds or does not exceed the packet size threshold value. Additionally, the packet is conveyed to switch 150, which is set by the output from switch control processor and connection request handler 154 so the packet will be routed to photonic switching fabric 112 or to electrical packet switching fabric 116. For example, the routing is based on the determination by switch control processor and connection request handler 154 based on whether the length of the packet exceeds or does not exceed a set packet length or another threshold. Switch 150 may be a simple switch. If the packet is routed to photonic switching fabric 112, it is passed to buffer and delay 152, and then to photonic switching fabric 112. Buffer and delay 152 stores the packet until the appropriate destination port of photonic switching fabric 112 becomes available, because of the lack of photonic buffering or storage. Buffer and delay 152 may include an array of buffers to provide buffering and delay for packets going to a particular address or output port that is busy without delaying traffic to other output ports from the photonic switch.

However, if the packet is routed to electrical packet switching fabric 116, it goes to buffer 156, statistical multiplexer 158, and statistical demultiplexer 160, then to electrical packet switching fabric 116. Buffer 156, which may contain an array of buffers, stores the packets until they are sent to electrical packet switching fabric 116. Packets from multiple packet streams may be statistically multiplexed by statistical multiplexer 158, so the ports of electrical packet switching fabric 116 may be more fully utilized. Statistical multiplexing may be performed to concentrate the short packet streams to a reasonable occupancy, so existing electrical packet switch ports are suitably filled with packets. For example, if the split in packet lengths is set up for an 8:1 ratio in bandwidths for the photonic switching fabric and the electrical packet switching fabric, the links to the electrical packet switching fabric may use 8:1 statistical multiplexing to achieve relatively filled links. This statistical multiplexing introduces additional delay in the short packet path, which may trigger incorrect packet sequencing during the combining process. Then, statistical demultiplexer 160 performs statistical demultiplexing for low occupancy data streams into a series of parallel data buffers.

Photonic switching fabric 112 contains control unit 114. The photonic switching fabric 112 may be a multistage solid state photonic switching fabric created from a series of several stages of solid state photonic switches. In an example, photonic switching fabric 112 is a 2 ns to 20 ns photonic fast circuit switch suitable for use as a synchronous long packet switch implemented as a 3 stage, as is shown in FIG. 5, or a 5 stage CLOS fabric fabricated from N×N and M×2M monolithic integrated photonic crosspoint chips in silicon or indium phosphide, where N is an integer that may range from about 8 to about 32 and M is an integer that may range from about 8 to about 16. Electrical packet switching fabric 116 may be an existing electrical packet fabric.

Electrical packet switching fabric 116 may receive packets using statistical demultiplexer 160 and statistically multiplex already switched packets using statistical multiplexer 164. The packets are then demultiplexed by statistical demultiplexer 174 in combiner 120. Electrical packet switching fabric 116 may include processing functions responsive to the packet routing information in any conventional manner for an electrical packet switch and buffer 162, which may include arrays of buffers. Electrical packet switching fabric 116 should be able to handle the packet processing associated with handling only the short packets, which may place some additional constraints and demands on the processing functions. Because the bandwidth flowing through photonic switching fabric 112 is greater than the bandwidth flowing through electrical packet switching fabric 116, the number of links to and from photonic switching fabric 112 may be greater than the number of links to and from electrical packet switching fabric 116.

The switched packets from photonic switching fabric 112 and electrical packet switching fabric 116 are fed to combiner 120, which combines the two switched packet streams. Combiner 120 contains packet granular combiner and sequencer 166. The photonic packet stream is fed to buffer 172 to be stored, while the address and sequence is read by packet address and sequence reader 168, which determines the source and destination address and sequence number of the photonic packet. The electrical packet stream is also fed to statistical demultiplexer 174 to be statistically demultiplexed and to buffer 176 to be stored, while its characteristics are determined by the packet address and sequence reader 168. Then, packet address and sequence reader 168 determines the sequence to read packets from buffer 172 and buffer 176 based on interleaving packets from both paths to restore a sequential sequence numbering of the packets in each packet flow, so the packets of the two streams are read out in the correct sequence. Next, the packet sequencing control unit 170 releases the packets in each flow in their original sequence. As the packets are released by packet sequence control unit 170, they are combined using switch 178, which may be a simple switch. Splitter 106 may be integrated in TOR switch 104, and combiner 120 may be implemented in TOR switch 128. Also, packet granular combiner and sequencer 166 may optionally contain decelerator 167, which decelerates the packet stream in time, decreasing the inter-packet gap. For example, Decelerator 167 may reduce the inter-packet gap to the original inter-packet gap before accelerator 147. Acceleration and deceleration are further discusses in patent application Ser. No. 13/901,944 entitled "System and Method for Accelerating and Decelerating Packets" submitted on May 24, 2013, which is hereby incorporated by reference.

Figure 7:
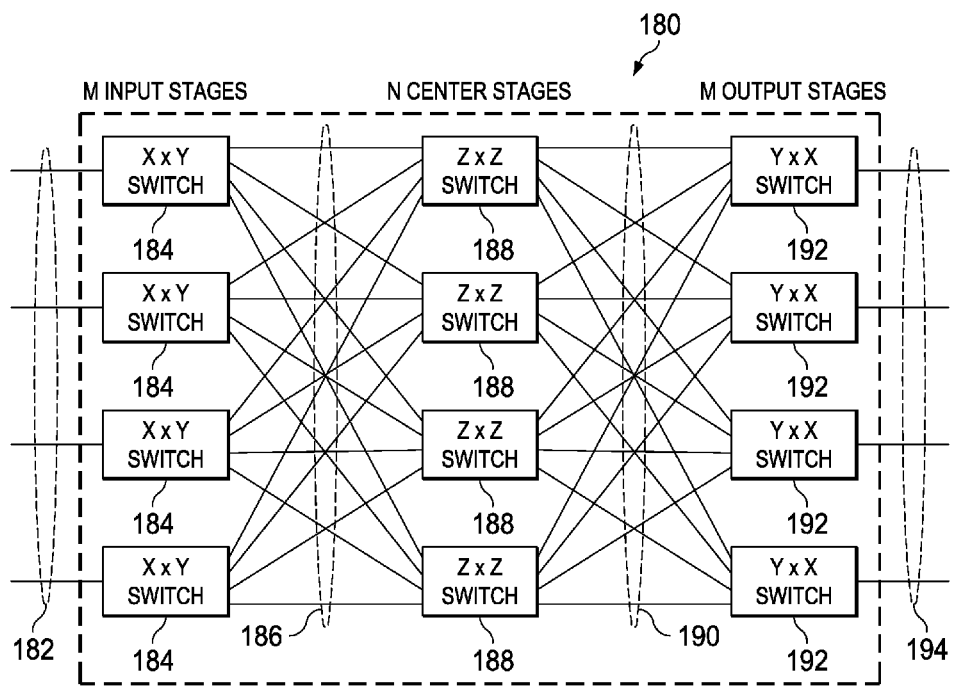
FIG. 7 illustrates an embodiment array of photonic switches.

FIG. 7 illustrates an example three stage CLOS switch 180 fabricated from 16×16 fast photonic integrated circuit switch chips. For example, CLOS switch 180 has a set up time from about 2 ns to about 20 ns. CLOS switch 180 contains inputs 182 which are fed to input stage fabrics 184, which are X by Y switches. Junctoring pattern of connections 186 connects input stage fabrics 184 and center stage fabrics 188, which are Z by Z switches. X, Y, and Z are positive integers. Also, junctoring pattern of connections 190 connect center stage fabrics 188 and output stage fabrics 192 which are Y by X switches to connect every fabric in each stage equally to every fabric in the next stage of the switch. Output stage fabrics 192 produce outputs 194. Four input stage fabrics 184, center stage fabrics 188, and output stage fabrics 192 are pictured, but fewer or more stages (e.g. 5-stage CLOS) or fabrics per stage may be used. In an example, there are the same number of input stage fabrics 184 and output stage fabrics 192, with a different number of center stage fabrics 188, and Z is equal to Y times the number of input stages divided by the number of center stages. The effective port count of CLOS switch 180 is equal to the number of input stage fabrics multiplied by X by the number of output stage fabrics multiplied by X. In an example, X is equal to 2X−1, and CLOS switch 180 is non-blocking. In another example, X is equal to Y, and CLOS switch 180 is conditionally non-blocking, and existing circuits may have to be arranged to clear some new paths. A non-blocking switch is a switch that connects N inputs to N outputs in any combination irrespective of the traffic configuration on other inputs or outputs. A similar structure can be created with 5 stages for larger fabrics, with two input stages in series and two output stages in series.

Figure 8:
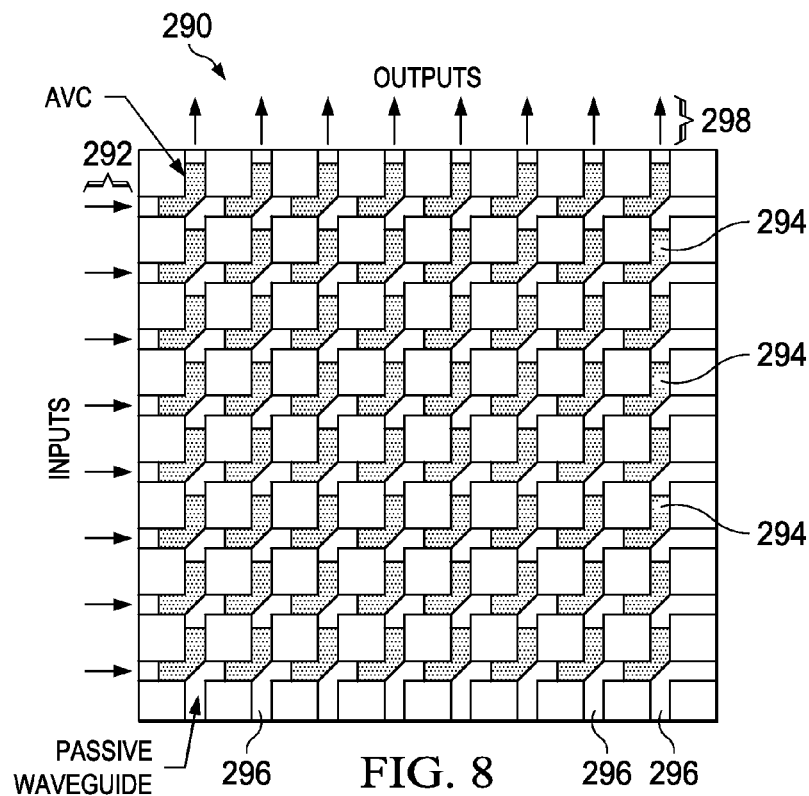
FIG. 8 illustrates an embodiment photonic switch.

FIG. 8 illustrates solid state photonic switch 290 for the case of N=8. Switch 290 may be used for fabrics in input stage fabrics 184, center stage fabrics 188, and output stage fabrics 192. Switch 290 may be a non-blocking indium phosphide or silicon solid state monolithic or hybridized switch crosspoint array. Switch 290 contains inputs 292 and outputs 298. Switch 290 contains eight inputs 292 and eight outputs 298, although it may contain more or fewer inputs and outputs. Also, switch 290 contains active vertical couplers (AVCs) 294 and passive waveguides 296. AVCs 294 are created by combining a semiconductor optical amplifier (SOA) with vertical coupling at the cross points where the input lines and the output lines cross each other. When an electrical current is driven into the SOA, it becomes transparent, and exhibits gain, so the signal on the input line, coupled into the SOA by the vertical coupler, is amplified, and emitted into the output line when coupled through a second vertical coupler. When no current is driven into the SOA, it remains opaque with no optical gain, and the light remains in the input waveguide, propagating to the next cross point.

Figure 9:
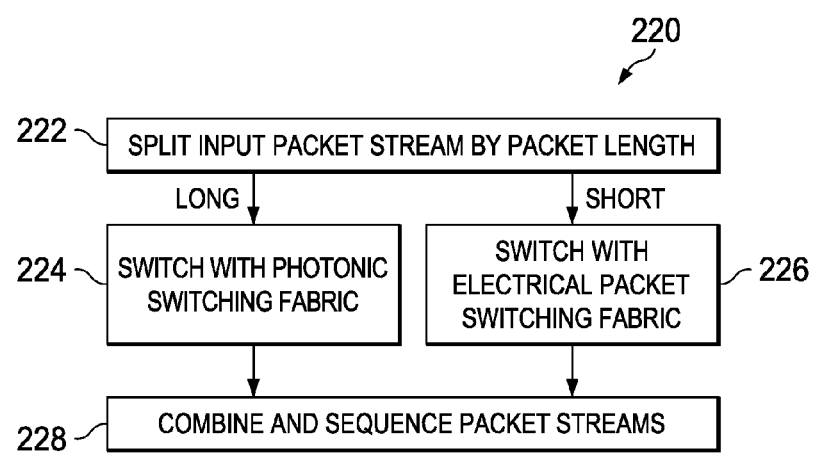
FIG. 9 illustrates a flowchart of an embodiment method of packet stream routing.

FIG. 9 illustrates flowchart 220 for a method of routing packets. Initially, in step 222, the input packet stream is split into two packet streams. One of the two packet streams is routed to a photonic switching fabric, where it is switched in step 224. The other packet stream is routed to an electrical packet switching fabric, where it is switched in step 226. In an example, long packets are routed to the photonic switching fabric and short packets are routed to the electronic switching fabric. Finally, the two switched packet streams are combined and sequenced in step 228. For examples, the packets from the photonic packet stream and the electronic packet stream many be combined based on a sequence number. In an example, long packets are routed to the photonic switching fabric, and short packets are routed to the electrical packet switching fabric.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for steering an input packet stream, the system comprising:
   a traffic splitter configured to:
      split the input packet stream into a first packet stream and a second packet stream in accordance with a packet size, wherein each packet is placed in the first packet stream for photonic switching in accordance with a length of the packet being greater than or equal to a first packet size threshold, or in the second packet stream for electrical switching in accordance with the length of the packet being less than the first packet size threshold;
      pad packets of the first packet stream to a fixed length in accordance with the placing the packets in the first packet stream; and
      leave packets of the second packet stream unpadded in accordance with the placing the packets in the second packet stream;
   a photonic switching fabric coupled to the traffic splitter, wherein the photonic switching fabric is configured to switch the first packet stream of fixed-length padded packets; and
   an electrical packet switching fabric coupled to the traffic splitter, wherein the electrical packet switching fabric is configured to switch the second packet stream of unpadded packets.

2. The system of claim 1, wherein the traffic splitter comprises a packet granular flow diverter configured to direct each packet into the first packet stream or the second packet stream.

3. The system of claim 2, wherein the traffic splitter further comprises a packet length module coupled to the packet granular flow diverter, wherein the packet length module is configured to determine the length of each packet.

4. The system of claim 3, wherein the traffic splitter further comprises a statistics gathering module coupled to the packet length module.

5. The system of claim 2, wherein the packet granular flow diverter comprises:
   a switch; and
   a switch control processor coupled to the switch.

6. The system of claim 5, wherein the packet granular flow diverter further comprises:
   a first buffer coupled between the switch and the photonic switching fabric, wherein the first buffer is configured to buffer the first packet stream; and
   a second buffer coupled between the switch and the electrical packet switching fabric, wherein the second buffer is configured to buffer the second packet stream.

7. The system of claim 1, wherein the first packet size threshold is between 500 bytes and 1400 bytes.

8. The system of claim 1, wherein the first packet size threshold is between 500 bytes and 8400 bytes.

9. The system of claim 1, wherein the electrical packet switching fabric is deloaded by diverting packets of the first packet stream from the electrical packet switching fabric to the photonic switching fabric.

10. The system of claim 1, wherein packets of the input packet stream have a bimodal distribution.

11. A method of steering an input packet stream, the method comprising:
   splitting the input packet stream into a first packet stream and a second packet stream, the splitting comprising placing each packet in the first packet stream for electrical switching in accordance with a packet length of the packet being less than a first packet size threshold, or in the second packet stream for photonic switching in accordance with the packet length of the packet being greater than or equal to the first packet size threshold;
   leaving packets of the first packet stream unpadded in accordance with the placing the packets in the first packet stream; and
   padding packets of the second packet stream to a fixed length in accordance with the placing the packets in the second packet stream;
   directing the first packet stream of unpadded packets to an electrical packet switching fabric; and
   diverting the second packet stream of fixed-length padded packets around the electrical packet switching fabric and to a photonic switching fabric.

12. The method of claim 11, further comprising:
   switching the second packet stream with the photonic switching fabric;

switching the first packet stream by the electrical packet switching fabric; and combining the switched first packet stream and the switched second packet stream.

13. The method of claim 12, wherein combining the switched first packet stream and the switched second packet stream comprises reordering the switched first packet stream and the switched second packet stream in accordance with packet sequence numbers in the switched first packet stream and the switched second packet stream.

14. The method of claim 11, further comprising monitoring splitting the input packet stream.

15. The method of claim 11, further comprising:
determining addresses of packets of the input packet stream; and
determining lengths of packets of the input packet stream.

16. A system for enhancing a traffic carrying capacity of a packet switching node, the system comprising:
a plurality of packet stream splitters configured to split a first plurality of input packet streams into a second plurality of packet streams and a third plurality of packet streams in accordance with a comparison of lengths of packets of the first plurality of input packet streams to a first packet size threshold, wherein each packet stream splitter of the plurality of packet stream splitters is configured to:
place each packet of a first input packet stream of the first plurality of input packet streams in a second packet stream of the second plurality of packet streams for photonic switching in accordance with a length of the packet of the first input packet stream being greater than a first packet size threshold, or in a third packet stream of the third plurality of packet streams for electrical switching in accordance with the length of the packet of the first input packet stream being less than or equal to the first packet size threshold;

pad packets of the second packet stream to a fixed length in accordance with placing the packets in the second packet stream; and leave packets of the third packet stream unpadded in accordance with the placing the packets in the third packet stream;

a photonic switch, having a first capacity, configured to switch the second plurality of packet streams of fixed-length padded packets to produce a fourth plurality of packet streams;

an electronic packet switch having a second capacity less than the first capacity of the photonic switch, wherein the electronic packet switch is configured to switch the third plurality of packet streams of unpadded packets to produce a fifth plurality of packet streams; and a plurality of packet stream combiners configured to merge the fourth plurality of packet streams and the fifth plurality of packet streams to produce a sixth plurality of packet streams.

17. The system of claim 16, wherein the sixth plurality of packet streams have a same ordering as the first plurality of input packet streams.

18. The system of claim 16, wherein the plurality of packet stream splitters comprises:
a plurality of packet sequence controllers; and
a plurality of switches coupled to the plurality of packet sequence controllers.

19. The system of claim 16, wherein the plurality of packet stream splitters comprise a plurality of packet granular flow diverters.

20. The system of claim 16, wherein the first packet size threshold is between 500 bytes and 8400 bytes.

21. The system of claim 20, wherein the first packet size threshold is between 500 bytes and 1400 bytes.

* * * * *